March 12, 1968    G. F. PEMBROKE ET AL    3,372,790
APPARATUS FOR FEEDING MOUTHPIECES FOR
CIGARS, CIGARETTES AND THE LIKE
Filed Sept. 12, 1966            8 Sheets-Sheet 1
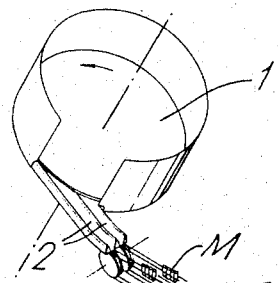
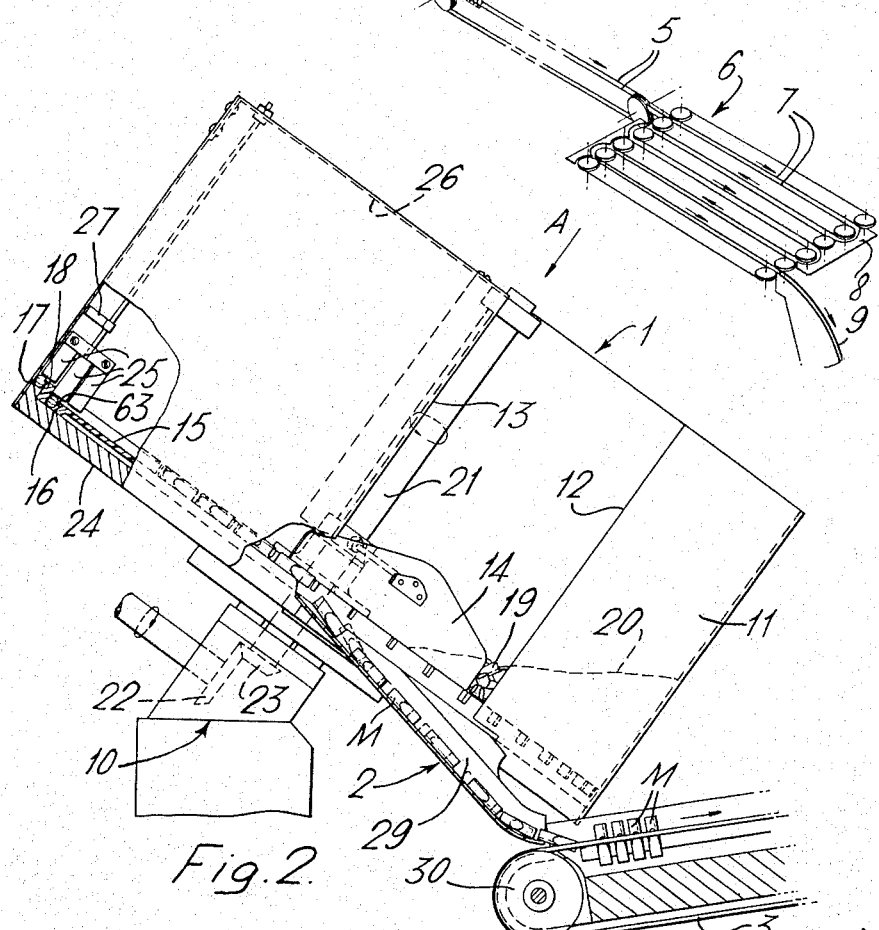

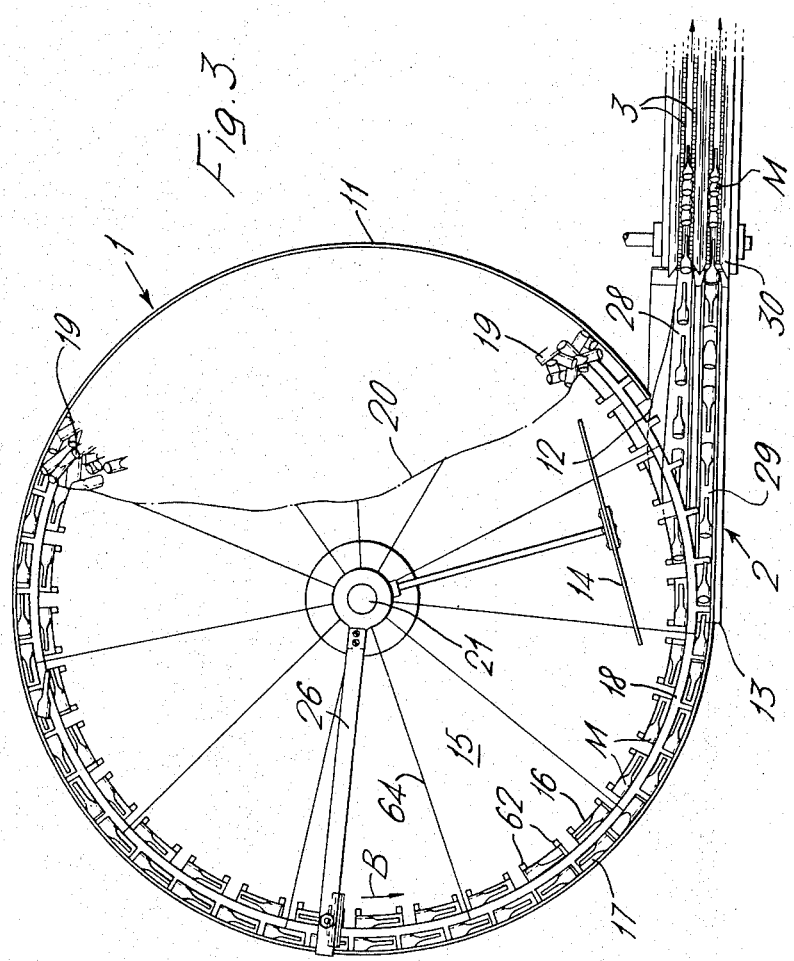

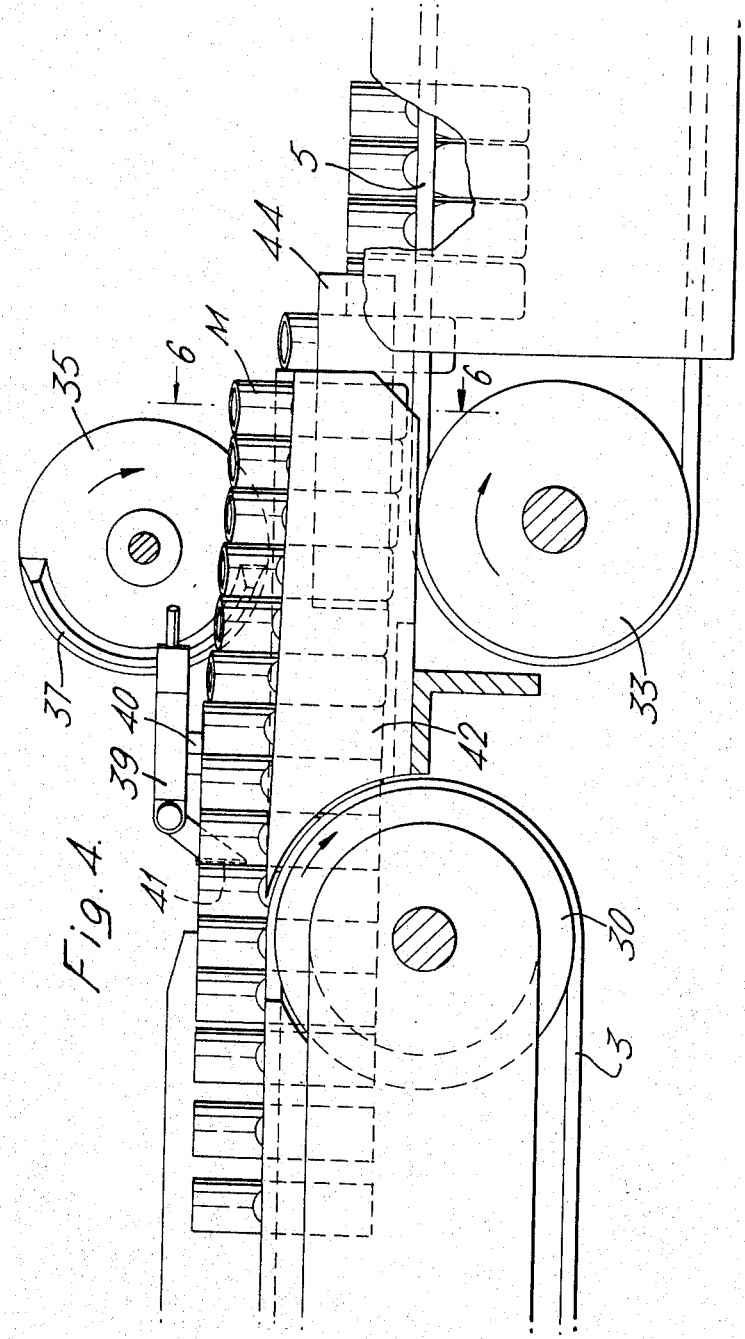

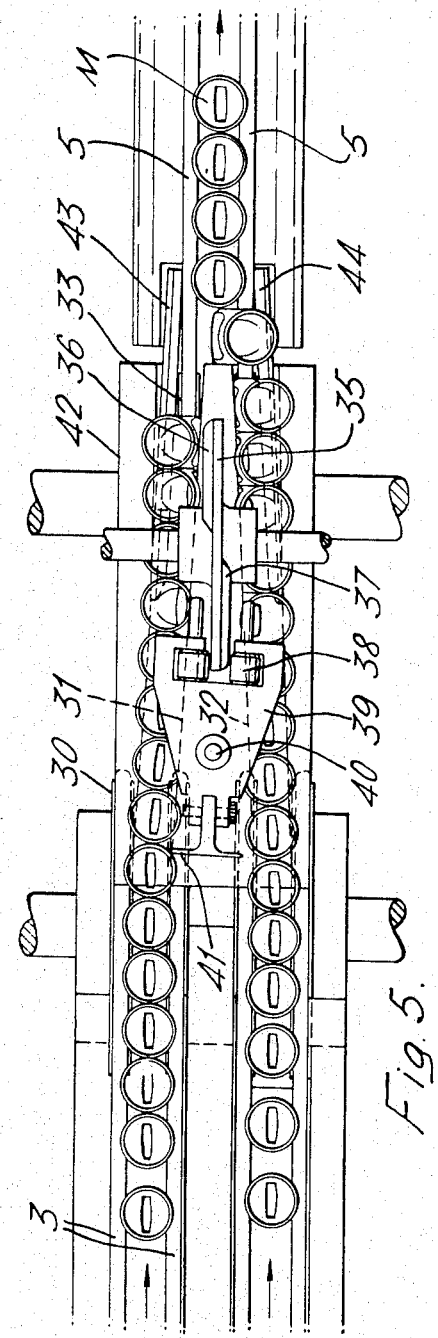
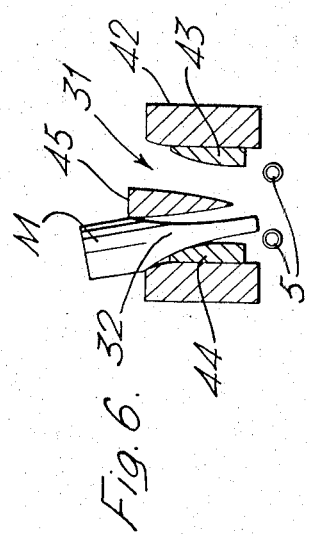

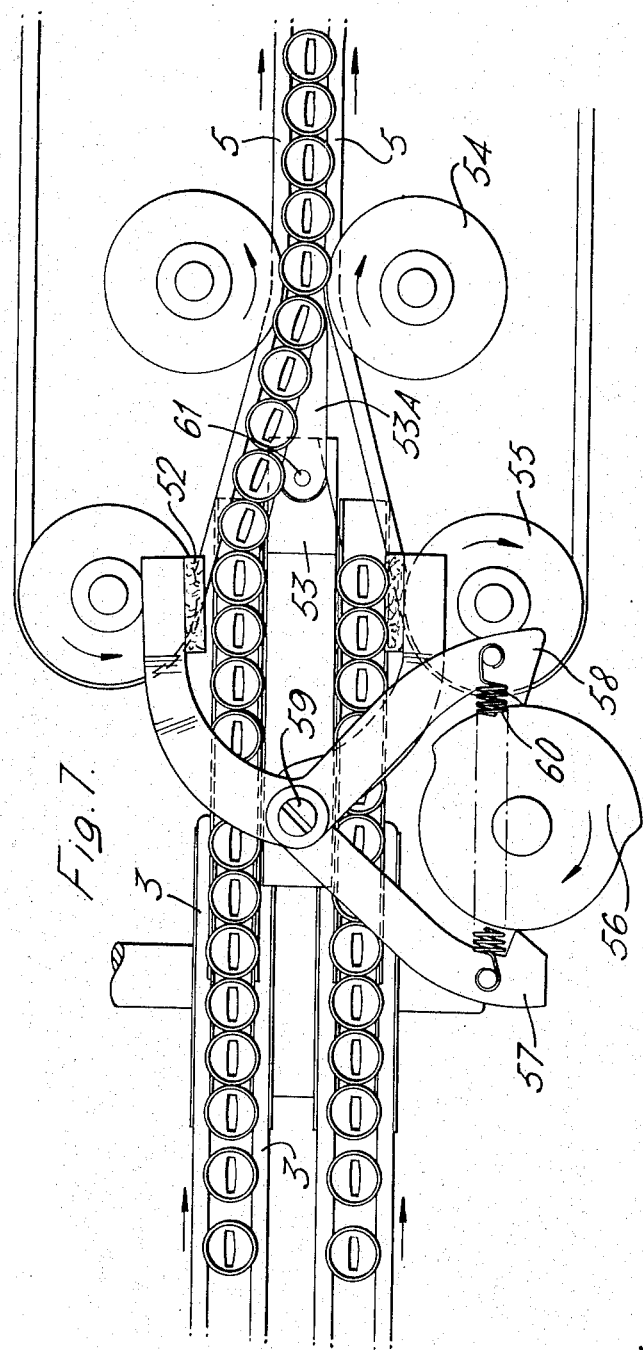

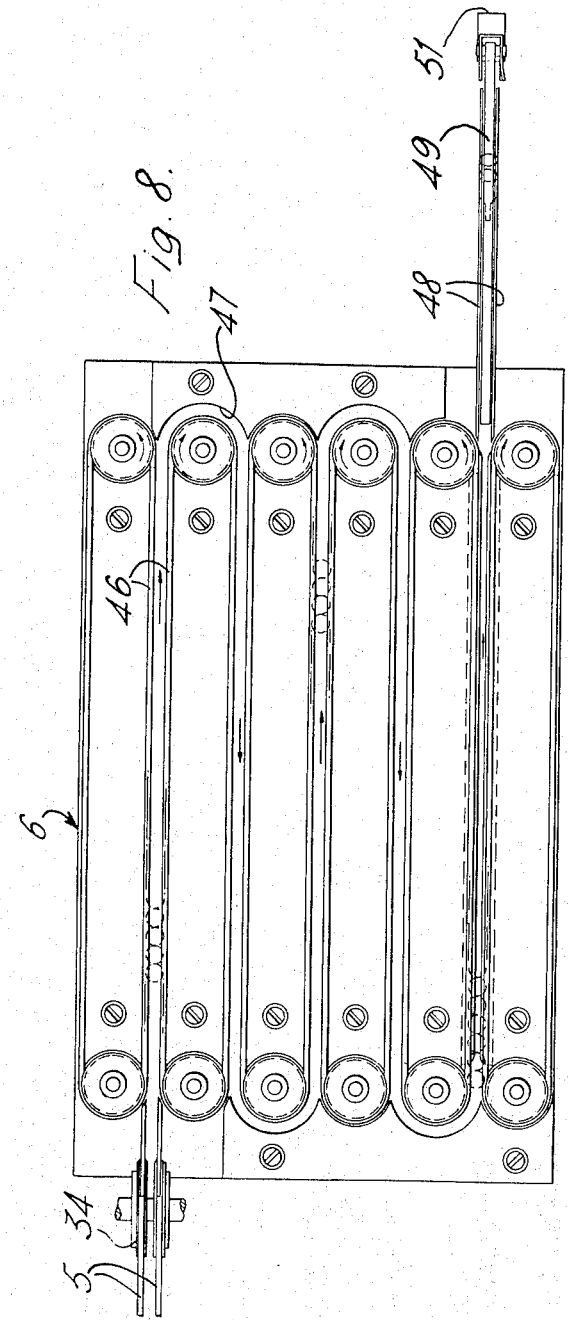

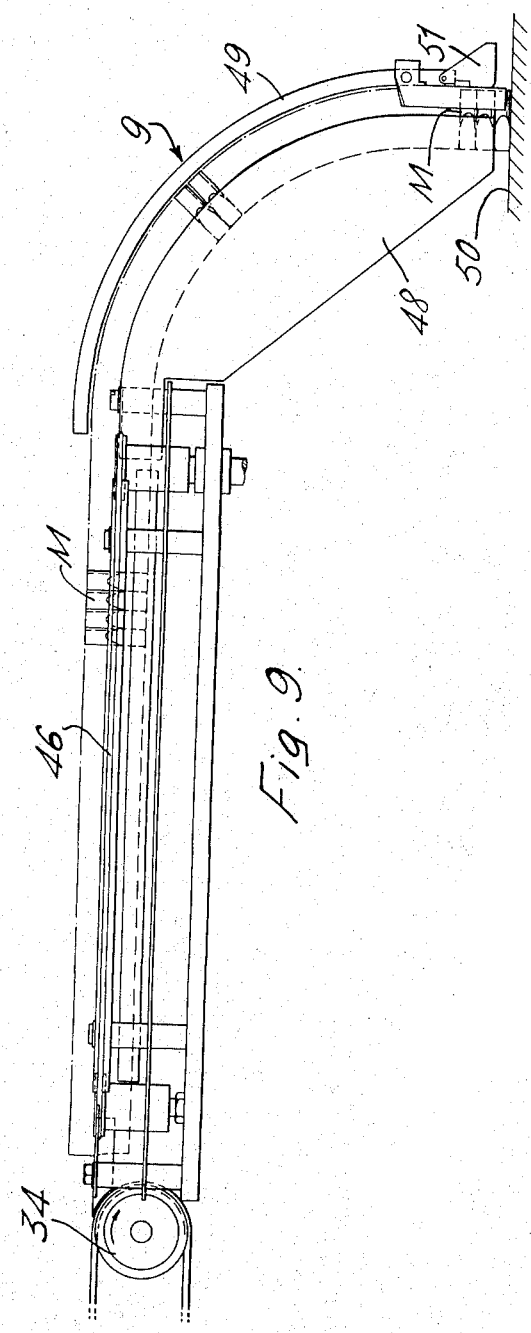

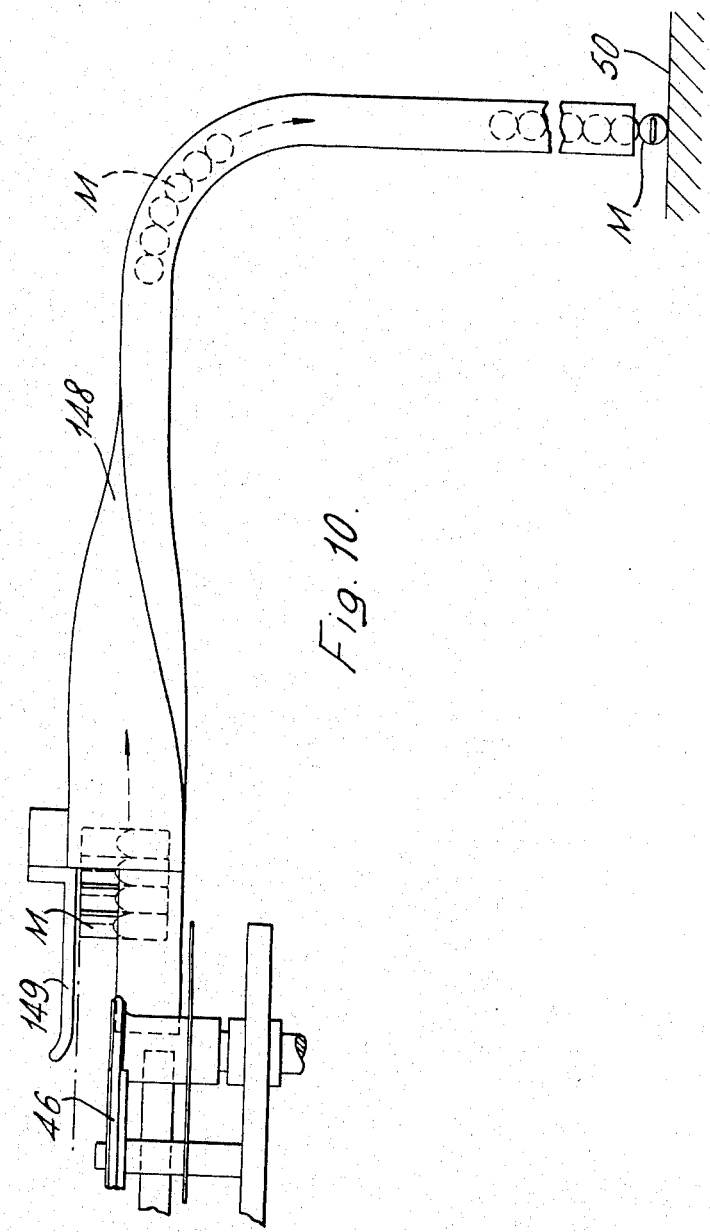

United States Patent Office 3,372,790
Patented Mar. 12, 1968

3,372,790
APPARATUS FOR FEEDING MOUTHPIECES FOR CIGARS, CIGARETTES AND THE LIKE
George Frederick Pembroke, James George Edward Hillman, and John Elliott New, Deptford, London, England, assignors to Molins Machine Company Limited, London, England, a corporation of Great Britain
Filed Sept. 12, 1966, Ser. No. 578,800
Claims priority, application Great Britain, Sept. 16, 1965, 39,623/65
5 Claims. (Cl. 198—33)

This invention concerns apparatus for feeding mouthpieces for cigars, cigarettes and the like, referred to below as smoking articles.

The mouthpieces in question resemble the cigarette holders which some smokers use, that is, they have a portion, usually a cylindrical tube, which fits on to or over an end of the smoking article, joined to a flattened portion which the smoker places between his lips. The mouthpieces to which the invention applies are however comparatively short and they are intended to be permanently attached to the smoking article. In the case of cigars, the end to which the mouthpiece is attached is itself cylindrical in the present example, but, of course, the mouthpiece may be shaped to fit on to or go over any other shape of cigar or other smoking article. The weight of distribution in the mouthpiece is such that if the mouthpiece is allowed to fall freely it falls with the flattened end leading.

According to the invention there is provided apparatus for feeding and orientating mouthpieces having flattened end portions, which comprises means for extracting a succession of randomly orientated mouthpieces from a bulk supply and delivering them in succession on to a pair of elements, e.g. conveyor bands, which support the said mouthpieces as a column and which are spaced apart sufficiently to permit the flattened end portions of mouthpieces to pass between them, the mouthpieces being supported by the said elements engaging the larger portions of the mouthpieces.

The apparatus may comprise a hopper to contain the said bulk supply, the said hopper having a base which includes a rotatable plate having a ring of openings arranged concentrically with the axis of rotation of the said plate, each opening being capable of accommodating one mouthpiece, and which also includes a fixed plate beneath the rotatable plate and having an aperture which registers with successive openings in the rotatable plate, so that successive mouthpieces can drop through said aperture out of the hopper to be delivered to said pair of elements. The apparatus may further comprise a chute to receive successive articles from said hopper and to deliver them as a column on to said pair of elements by which they are orientated in the same direction. There may be provided a reservoir to receive mouthpieces which have been orientated in the same direction, said reservoir comprising a number of parallel conveyors on which the mouthpieces are moved in a sinuous column towards an outlet.

The rotatable plate may have two concentric rings of openings and the fixed plate has two apertures, one for each of said rings of apertures, the apparatus further including two of said pairs of elements to support mouthpieces as two columns. The apparatus may include switching means for switching the two columns into a single column, and the switching means may include a pair of converging guides leading to a single channel, and a cam-controlled stop member operative to stop the mouthpieces in each column in alternation, while the mouthpieces in the column not stopped are allowed to proceed into the channel.

The invention will be more fully described with reference to the accompanying drawings in which:

FIGURE 1 is a diagram showing an outline of the apparatus,

FIGURE 2 is an elevation of a hopper for feeding mouthpieces and shows the delivery thereof to a conveyor system, parts of the view being broken away and parts in section, FIGURE 3 is a plan view of FIGURE 2 looking in the direction of the arrow A, FIGURE 4 is a side elevation of part of the conveyor system showing how two lines of mouthpieces are brought into a single line, parts of the view being broken away and parts in section, FIGURE 5 is a plan of FIGURE 4, FIGURE 6 is a local section of FIGURE 4 on the line 6—6, FIGURE 7 is a plan of part of the conveyor system showing a different way of bringing two lines of mouthpieces into a single line, FIGURE 8 is a plan view of the end of the conveyor system.

FIGURE 9 is an elevation of FIGURE 8, and

FIGURE 10 shows an alternative to the device shown at the right-hand side of FIGURE 9.

Referring first to FIGURE 1, 1 is a hopper into which mouthpieces M are dumped and 2 is a delivery chute through which two rows of mouthpieces are discharged from the hopper, the mouthpieces being orientated at random. From the chute 2 the mouthpieces fall onto pairs of conveyor bands 3 and owing to the fact that the flattened ends of the mouthpieces are heavier than the other ends they lie on the bands with the flattened ends protruding below the bands. These conveyors constituted by the bands 3 are the beginning of the conveyor system.

The mouthpieces then arrive at a device marked 4 which converts the two parallel lines of mouthpieces into a single line and deposits them on a further conveyor consisting of a pair of conveyor bands 5. This conveyor delivers the mouthpieces on to a tortuous conveyor system 6 consisting of a number of pairs of parallel bands 7 and guides 8 whereby a long sinuous path is provided so that a reservoir of considerable capacity is provided, constituting the end of the conveyor system. 9 is an outlet track for the mouthpieces.

The double tracks of the delivery chute 2 are provided to obtain the necessary output from the hopper but more tracks could be provided. A single track is possible if a lower output is sufficient for some purposes but when two or more tracks are provided it is desirable to bring the mouthpieces into a single line to suit the apparatus in which further operations are conducted.

Referring now to FIGURE 2, it will be noticed that the hopper 1 is tilted and so is the conveyor comprising the bands 3 but to assist in appreciating the angular disposition of the parts, a line marked 10 is horizontal. The hopper is of generally cylindrical shape but the side 11 terminates at 12 and 13 respectively and in the space thus left open can be seen a shield 14 whose purpose is explained later. The base 24 of the hopper is fixed and above it is a rotatable disc 15 which has two concentric rows 16 and 17 of mouthpiece receptacles which are separated by a rib 18. Each receptacle is just large enough to contain one mouthpiece and is formed by an aperture in the disc 15, i.e. it is open at the bottom.

Mouthpieces are dumped at random into the hopper as indicated at 19 FIGURE 2 and pile up in the lower part of the hopper as indicated by the dotted line 20 FIGURES 2 and 3. The disc 15 is fixed to a shaft 21 which is driven through bevel gear wheels 22 and 23 and, as it rotates, the mouthpieces drop into the receptacles with flattened and cylindrical parts pointing in either direction at random.

The open side of the hopper, that is, between the lines 12 and 13, permits mouthpieces to drop out of the receptacles, since at this point the hopper base 24 is cut away, as FIGURE 3, to permit the mouthpieces to drop down, for, as aforesaid the receptacles are open at the bottom.

Thus as the disc 15 rotates in the direction of arrow B, FIGURE 3, mouthpieces drop into the receptacles from the heap indicated by the line 20 and come round towards the outlet, that is, to the delivery chute 2 in two rows, the mouthpieces pointing either way in the chute. Any surplus mouthpieces slide down the sloping face of the disc 15 to join the mass in the lower part of the hopper.

To prevent loose mouthpieces which may be riding on top of those in the receptacles from coming down to the outlet, three flexible flaps 25, FIGURE 2, are provided, supported by a strip 26 loosely mounted on the shaft 21 and held in position by a stay 27 fixed to the hopper side. The shield 14 is provided for the same purpose, that is, to prevent loose mouthpieces from falling down towards the outlet. It may happen that the flattened end of a mouthpiece will enter an already filled receptacle between the end of the mouthpiece and the end wall of a receptacle, in which case it will stand upright and cause trouble in the operation of the apparatus. To overcome this narrow slots 62, see FIGURE 3, are provided at each end of the receptacle with sloping walls 63, see FIGURE 2, and any such mouthpiece will fall over and move clear of the receptacle. The purpose of the rib 18 is to provide a wall against which mouthpieces going to the inner ring of receptacles can be arrested and guided into the receptacles. The outer ring has the wall 11 of the hopper to serve this purpose so no other provision is necessary. The outer ring is higher than the inner one so as to reduce the distance between the top of the rib 18 and the base of the receptacles in the outer ring to the proper dimension.

The chute 2 consists of a pair of parallel troughs 28–29 down which the discharged mouthpieces slide and eventually they drop on to the pairs of conveyor bands 3, which are endless bands mounted on pulleys 30 FIGURES 2, 3, 4 and 5. They are preferably formed as close-wound helical springs which are stretched slightly when mounted on the pulleys. These form very satisfactory bands and their slight roughness helps to convey the mouthpieces in a satisfactory manner. As previously mentioned the mouthpieces fall on to the bands and their flattened ends pass down between them.

One construction of the device marked 4 on FIGURE 1 is shown on FIGURES 4 to 6. At the delivery end of the bands 3 the mouthpieces are discharged into converging guide troughs 31 and 32 along which they are urged by the pressure of the following mouthpieces on the bands 3. The troughs lead to the single pair of conveyor bands 5 which are carried on pulleys 33, FIGURES 4 and 5, and 34, FIGURES 8 and 9. About midway along the length of the troughs 31 and 32 is a cam 35 which has raised cam surfaces 36 and 37 on its faces, each cam surface extending for approximately 180°. The cam surfaces engage alternately with rollers 38 mounted on a rocking lever 39 pivoted at 40. At the end of the lever 39, remote from the rollers is adjustably fixed a double-headed separator 41. When the parts are as shown in FIGURE 5, the separator prevents mouthpieces on the upper pair of bands (in that view) from moving into the trough 31 so that only the trough 32 continues to function and mouthpieces drop out of the right hand end of the trough 32 between the bands 5. To assist the movement the body 42 in which the troughs are formed slopes downwards on its top face from left to right, FIGURE 4, and guide strips 43 for trough 31 and 44 for trough 32 are provided which, in combination with a central guide strip 45, see FIGURE 6, directs the mouthpieces through the proper path. As the cam 35 completes half a revolution the separator 41 swings over to the opposite position, stopping the movement of mouthpieces into the trough 32 and permitting the others to pass into trough 31.

The device shown in FIGURE 7 is an alternative to that shown in FIGURES 4–6. The mouthpieces coming along in two rows between the bands 3 are stopped alternately by pads 52 so that only mouthpieces from one row can proceed to the single channel. For this purpose the mouthpieces are guided by a tapering tongue 53 on one side and on the other by the bands 5 which are spread outwards from one another by pulleys 54 and 55 so as to provide two converging paths leading into the parallel portion of the bands 5. One part of the tongue 53 marked 53A is pivoted at 61 and swings under the pressure of the passing mouthpieces to guide them accurately into the single channel. The pads 52 are moved in and out from the operative position by a cam 56 which operates cam levers 57 and 58 pivoted at 59 and pulled into contact with the cam by a spring 60.

The conveyor bands 5 carry the mouthpieces in single line and deliver them to the device 6, FIGURE 1, which is shown in detail in FIGURES 8 and 9. This consists of a series of conveyor bands 46 arranged parallel to one another so that the mouthpieces from bands 5 pass between a first pair of bands 46 and at the right-hand end of FIGURE 8 they are guided round through 180°; partly by the aid of one of the bands 46 and partly by a semi-circular guide 47 and then the mouthpieces move in the opposite direction between the next pair of bands 46 and so on until the whole of the path defined by the bands and guides is filled with mouthpieces as a sinuous column thus providing a large reservoir. At the end of the lowest pair of bands, as seen in FIGURE 8, the mouthpieces pass down the outlet track 9 consisting of a pair of curved guides 48 provided with a curved cover or shroud 49 and eventually the leading mouthpieces form a short vertical column at the lower end of guides 48, resting on a surface 50. A pivoted door 51 provides access to the column when required. Later the mouthpieces are moved along the surface 50 by any suitable means and carried to other mechanism for further operations.

In FIGURE 10 is illustrated an alternative to the arrangement of curved guides 48 and shroud 49 just described with reference to FIGURES 8 and 9. In this arrangement the pair of guides is replaced by a tubular guide 148 into which the mouthpieces pass from the bands 46, a top guide 149 being provided at the entrance to the tube. The tube 148 is curved so as to lead the mouthpieces down to the surface 50, but is also twisted as shown so that as the mouthpieces move through it they are twisted through 90° as illustrated in FIGURE 10.

It will be noted on FIGURE 3 that the rotatable disc 15 is divided into a number fo sectors by radial lines. This is merely a constructional feature as for economy each sector can be moulded from a suitable plastic and the whole lot joined together to form a complete disc.

What we claim as our invention and desire to secure by Letters Patent is:

1. Apparatus for feeding and orientating mouthpieces having flattened end portions, which comprises means for extracting a succession of randomly oriented mouthpieces from a bulk supply and delivering them in succession onto at least one pair of elongated generally parallel elements which support said mouthpieces as a column and which are spaced apart sufficiently to permit the flattened end portions of said mouthpieces to pass between them, the mouthpieces being supported by said elements engaging the larger portions of the mouthpieces, said apparatus further comprising a reservoir to receive from said elements mouthpieces which have been orientated in the same direction, said reservoir comprising a plurality of parallel conveyors operatively associated in end-to-end relationship on which the mouthpieces are moved in a sinuous path towards an outlet.

2. Apparatus as claimed in claim 1, comprising a chute to receive successive mouthpieces from said hopper and to deliver them as a column on to said pair of elements, said pair of elements being capable of orienting said mouthpieces in the same direction.

3. Apparatus as claimed in claim 1, wherein the said rotatable plate has two concentric rings of openings and the said fixed plate has two apertures, one associated with each of said rings of openings, the apparatus further including two of said pairs of elements to support said mouthpieces as two columns.

4. Apparatus as claimed in claim 3, including switching means for switching the two columns into a single column.

5. Apparatus as claimed in claim 4, wherein the said switching means includes a pair of converging guides leading to a single channel, and a cam-controlled stop member operative to stop the mouthpieces in each column in alternation, while the mouthpieces in the column not stopped are allowed to proceed into the channel.

References Cited

UNITED STATES PATENTS

| 398,651 | 2/1889 | Peters | 198—33 |
| 1,185,329 | 5/1916 | Janisch | 198—32 X |
| 2,924,355 | 2/1960 | Birkett | 211—167 |

FOREIGN PATENTS 1,187,697  3/1959  France.

EDWARD A. SROKA, *Primary Examiner.*